(12) United States Patent
Lounsbury

(10) Patent No.: US 9,570,202 B2
(45) Date of Patent: Feb. 14, 2017

(54) METHODS OF FINE FORMING SAPPHIRE TUBES AND JOINING SAPPHIRE COMPONENTS FOR NUCLEAR REACTOR FUEL ELEMENTS AND ASSEMBLIES

(71) Applicant: Roger Ian Lounsbury, Deep River, CA (US)

(72) Inventor: Roger Ian Lounsbury, Deep River, CA (US)

( * ) Notice: Subject to any disclaimer, the term of this patent is extended or adjusted under 35 U.S.C. 154(b) by 1039 days.

(21) Appl. No.: 13/830,151

(22) Filed: Mar. 14, 2013

(65) Prior Publication Data

US 2014/0262007 A1 Sep. 18, 2014

(51) Int. Cl.
*C30B 1/12* (2006.01)
*G21C 3/07* (2006.01)
*G21C 21/02* (2006.01)

(52) U.S. Cl.
CPC ............... *G21C 3/07* (2013.01); *G21C 21/02* (2013.01); *Y02E 30/40* (2013.01)

(58) Field of Classification Search
CPC ............ C30B 1/12; C30B 29/16; C30B 29/66
See application file for complete search history.

(56) References Cited

PUBLICATIONS

Wilks, R.S., et al., "The Irradiation-Induced Macroscopic Growth of alpha-Al2O3 Single Crystals", UKAEA Research Group, Ceramics Division, Atomic Energy research Establishment, Harwell, UK, published in Journal of Nuclear Materials 24, (1987) 80-86.
Wachtman, J.R.Jr. et al., "Plastic Deformation of Ceramic-Oxide Single Crystals", National Bureau of Standards, Washington, D.C., Journal of the American Ceramic Society, vol. 37, No. 7 Jul. 1, 1954.
Gooch, D.J. et al., "The Creep of Sapphire Filament with Orientations Close to the c-axis", Department of Metallurgy, University of Oxford, UK, published in Journal of Materials and Science (1973) 1238-1246.
Harris, Daniel, et al., "Factors that Influence Mechanical Failure of Sapphire at High Temperature", Proceedings SPIE, 3060 (1997).
Nagae, Masahiro et al., "Corrosion Behavior of Structural Ceramics in Supercritical Water", published in Advanced Science and Technology, vol. 45 (2006) pp. 173-177.
Regan, Thomas M. et al., "Neutron Irradiation of Sapphire for Compressive Strengthening II. Physical Properties Changes", published in Journal of Nuclear Materials 300 (2002) 47-56.

(Continued)

*Primary Examiner* — Robert M Kunemund
(74) *Attorney, Agent, or Firm* — Ridout & Maybee LLP

(57) ABSTRACT

A method of fine surface finishing a cladding tube for a nuclear fuel element comprising a cladding tube containing fuel pellets, comprises heating the tube to thermal creep temperatures (e.g., 1750-2000 degrees Celsius) for sapphire and forming inner and outer surfaces of the tube to reduce ridge heights while limiting changes in the crystalline structure of the bulk of the tube. Alternatively, the tube may be placed in a mould and heating the tube-mould assembly to the range of the creep temperature of the sapphire at which differential thermal expansion of the mould and tube cause pressure at an interface between the sapphire and the mould. Maintaining the assembly at an upper end of the creep temperature range allows creep to progress and relieve stresses resulting from the pressure; and cooling the assembly to allow the sapphire tube to part from the mould and be withdrawn.

11 Claims, 3 Drawing Sheets

(56) References Cited

PUBLICATIONS

Goto, Takayasu et al., "Elastic Constants of Corundum up to 1825 C", published in Journal of Geophysical Research, vol. 94, No. B6, pp. 7588-7602, Jun. 10, 1989.

Qiu et al., "Phase Relations in the Aluminum Carbide—Aluminum Nitride—Aluminum Oxide System", published in the Journal of the American Ceramic Society, vol. 80, No. 8 2013-2020 (1997).

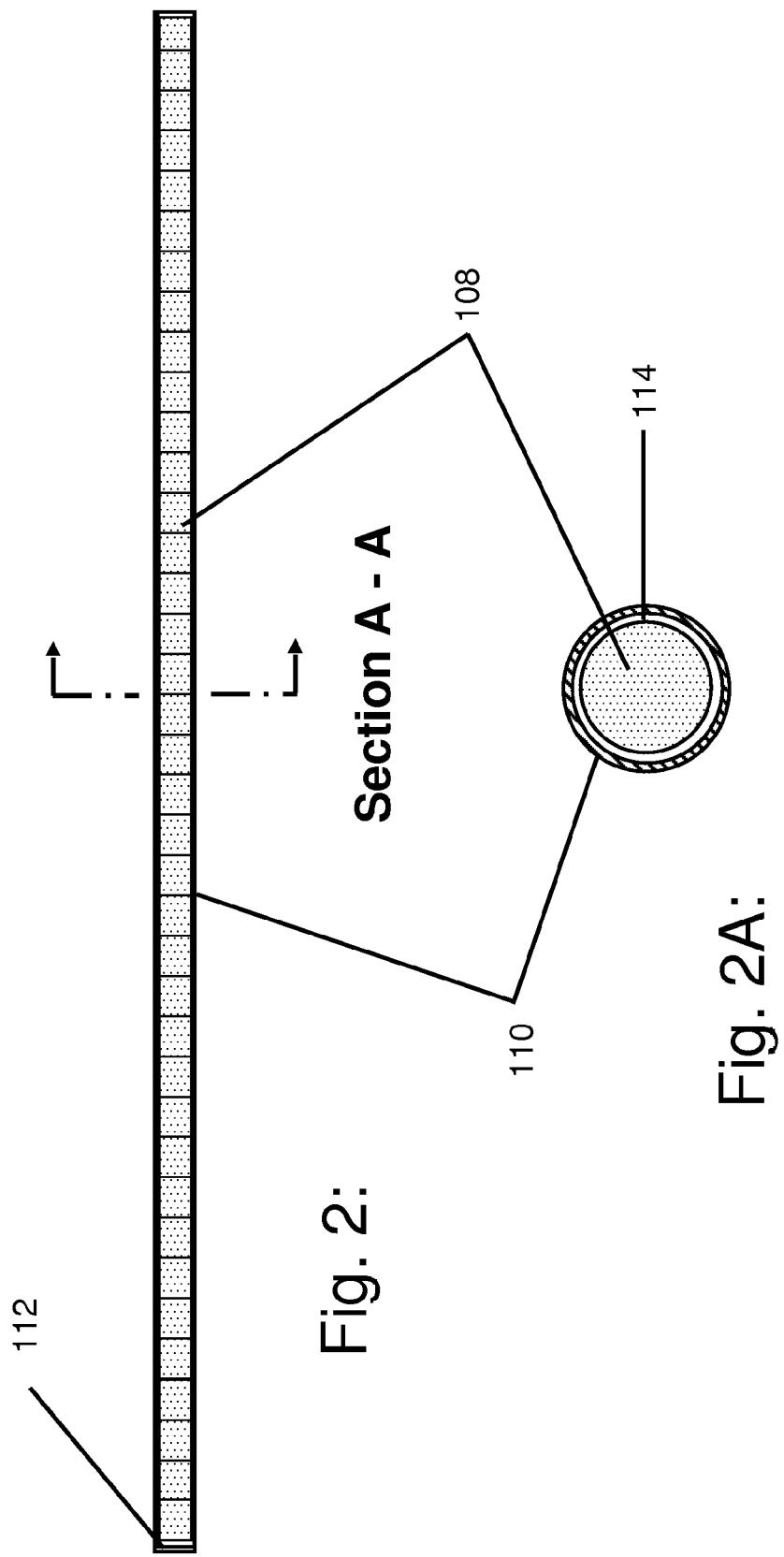

III-III magnified 4 times

METHODS OF FINE FORMING SAPPHIRE TUBES AND JOINING SAPPHIRE COMPONENTS FOR NUCLEAR REACTOR FUEL ELEMENTS AND ASSEMBLIES

CROSS-REFERENCE TO RELATED APPLICATIONS

This application is related to application Ser. No. 13/829,812 filed concurrently herewith on Mar. 14, 2014, the entire contents of which are incorporated herein by reference.

TECHNICAL FIELD

This invention relates to nuclear reactor fuel elements having fuel pellets in cladding and, in particular, to methods of making the cladding and the cladding and fuel elements made thereby.

The invention is applicable to fuel elements suitable for use in nuclear reactors of the kind having pressure tubes and/or pressure vessels.

BACKGROUND ART

Conventionally, nuclear reactors comprise pressure tubes or pressure vessels, though nuclear reactors that have both pressure tubes and a pressure vessel have been disclosed.

At present, nuclear power plant safety is of particular concern in the aftermath of the Fukishama accident in Japan in 2011 and others in which the fuel becomes exposed after the reactor has shut down. Some proposals for improving safety have focused upon prolonging the time to catastrophic failure in a severe accident in which decay heat may cause either or both of fuel cladding failure and hydrogen production. One option is to provide passive decay heat removal following a severe accident but this requires the fuel cladding to be capable of retaining the fuel fission products while the decay heat is transferred from the fuel, predominantly by thermal radiation.

Although improving safety is of paramount importance, it is desirable to do so without reducing efficiency. In fact, there is an ongoing desire to improve the efficiency of nuclear reactor power plants without prejudice to their safety. Improved efficiency can be obtained by increasing operating temperatures. To this end, it has been proposed to build nuclear power reactors employing supercritical water which requires much higher operating pressures than the current art PWR, BWR and PHWR. A fuel must be capable of operating at the temperature and pressure of supercritical water, and withstanding the corrosive environment of irradiated supercritical water and radiation damage. The fuel cladding must also have acceptably low neutron absorption to function economically while desirably providing for passive decay heat removal following a severe accident in which the fuel becomes exposed after the reactor has shut down.

In this industry, a variety of terms are used for the pressure barrier between the fuel and the reactor coolant. For convenience, in the context of this specification, the term "cladding" will be used for such pressure barrier, whether in a pressure-tube or pressure-vessel type of reactor.

Also, the term "fuel elements" will be used to embrace both the fuel elements of a pressure-tube type of reactor and the fuel rods of a pressure-vessel type of reactor.

The term "fuel assembly" refers to a plurality of fuel elements which are held together in parallel. In the case of a PHWR, this fuel assembly usually is called a "fuel bundle".

The term "fuel channel" refers to an assembly of components in a pressure tube type reactor comprising the pressure tube and other components that maintain and provide insulation between the reactor coolant and moderator outside the pressure tube.

It is known to use supercritical water systems in fossil fuel power stations. However, the technologies, particularly materials, used in supercritical fossil fuel stations cannot necessarily be used in supercritical nuclear reactor stations where low neutron absorption and corrosion resistance at supercritical temperatures and radiation levels are particularly important. This is especially so for the fuels and the fuel assemblies containing them.

It is known, for example, to use stainless steel to clad fuel for a higher temperature operation. It is unlikely that, in severe accident conditions, this fuel cladding would have been capable of retaining fission products while passively transferring decay heat in a PHWR, PWR or BWR. In particular, under severe accident conditions, the temperature will become high enough to cause the conventional fuel cladding to oxidize and eventually melt, leading to hydrogen production and release of fission products.

Other steels, nickel and titanium-based alloys that have been studied for supercritical water reactor use also have relatively high neutron absorption and entail the use of enriched uranium. They would not be entirely suitable for use in applying similar reactor physics when refitting an existing reactor, for example a PHWR.

In his concurrently-filed patent application Ser. No. 13/829,812, the present inventor discloses fuel elements in which the fuel pellets are housed in a cladding tube made of sapphire. It is known to make sapphire tubes by growing the sapphire using edge defined film fed growth and using a die to form it into a tube. Although sapphire tubes made in this way may be satisfactory for general application, they would be of limited use as cladding in nuclear reactor fuel elements because their inner surfaces, as initially manufactured, have ridges that limit thermal contact between the fuel pellets and the cladding tube.

While it might be possible to grind the inner surfaces of the sapphire tubes to obtain a required smoothness for cladding, grinding would require very hard, for example diamond, grinding tools and be very time-consuming to obtain required cladding and component dimensions. Consequently, it may not be economical and commercially viable at this time.

SUMMARY OF INVENTION

The present inventor sought to mitigate the limitations of known methods of making sapphire tubes, especially for nuclear reactor fuel elements, or at least provide an alternative.

According to a first aspect of the invention, there is provided a method of surface finishing a cladding tube for a fuel element of a nuclear reactor core in which the cladding tube contains a plurality of fuel pellets, the method comprising the steps of:

taking a sapphire tube, heating the tube to thermal creep temperatures (e.g., 1750-2000 degrees Celsius);

slowly drawing and/or pushing the heated tube through a plug and die set to reduce heights of ridges on respective inner and outer surfaces of the tube while limiting changes in the crystalline structure, especially the crystal orientation, of the bulk of the tube.

The plug and die set may be dimensioned to provide substantially uniform wall thickness of the tube while reducing ridge height and limiting changes in the crystalline structure, especially the crystal orientation, of the bulk of the tube.

The forming may displace ridge material by producing shear along an "a" plane parallel to a principal "c" axis of the tube material.

The tube may be drawn or pushed in a similar manner through one or more additional plug and die sets having slightly larger inner diameters and slightly smaller outer diameters, respectively, so as to reduce ridge height in successive steps. A final plug and die then may have respective inner and outer diameters corresponding to finished outer and inner diameters of the tube.

After drawing by a first die, the tube may be allowed to thermally soak at a temperature slightly above the drawing temperature to alleviate work-hardening before being drawn by the next die so that the ridges remain workable during such drawing by the next die.

According to a second aspect of the invention, there is provided a method of thermal creep differential expansion moulding of a sapphire tube using a mould that is made of a material that has a different coefficient of expansion than sapphire and is non-wettable by sapphire, the mould being sized and shaped to give desired diameters and surface uniformity of at least one of inner and outer surfaces of the tube, the method comprising:

placing the rough sapphire tube in the mould and slowly heating the tube-mould assembly to the range of the creep temperature of the sapphire and causing pressure at an interface between the sapphire and the mould;

maintaining the assembly at the upper end of the creep temperature range for a creep and soak period to allow creep to progress and relieve the stresses from the pressure upon the sapphire tube from the mould; and slowly cooling the assembly, allowing the sapphire tube to part from the mould so that it can be withdrawn.

The mould may be adapted to apply pressure to form the inner surface or the outer surface of the sapphire, or both surfaces at the same time.

According to a third aspect of the invention, there is provided a method of making a joint between sapphire parts by:

providing at a joint interface between juxtaposed surfaces of the parts an infrared absorbing interstitial layer of aluminium nitride, and heating the layer by infrared illumination to the melting temperature of the juxtaposed surfaces of the sapphire parts, such that the aluminium nitride reacts with sapphire to form aluminium oxy-nitride compounds that, on cooling, provide required joining of the parts.

In a nuclear reactor core, the transfer of heat from the fuel to the cladding depends upon the smoothness of the inner surface of the cladding which determines the thermal contact between the fuel and the cladding. Uniformity of thickness of the cladding is desirable to equally distribute stress and strains resulting from coolant pressure external to the cladding and helium fill gas, fission product gas and fuel pellet contact pressure internal to the cladding.

Once formed and provided with fuel pellets, the tube may be closed off at each end with an end cap to form a fuel element. A plurality of these fuel elements may be assembled together with spacers and/or grid-like supports to form a so-called fuel bundle. These end caps and spacers and/or grids may be of the same material as the tube and finished by grinding in known manner. However, it may be desirable to form them using a method disclosed herein suitably adapted.

BRIEF DESCRIPTION OF DRAWINGS

Various objects, features, aspects and advantages of the present invention will become more apparent from the following detailed description of embodiments of the invention, which description is provided by way of example only and to be taken in conjunction with FIGS. 1 to 3A, inclusive, of the accompanying drawings.

FIG. 2 is a cross-sectional view of one of the PHWR fuel elements;

FIG. 2A is a cross-sectional view taken on the line A-A of FIG. 2.

DESCRIPTION OF SPECIFIC EMBODIMENTS

The drawings identify the components of nuclear reactor fuel element and fuel assembly disclosed in the above-identified concurrently-filed application Ser. No. 13/829,812, that may be manufactured using one or more of the methods disclosed herein.

Figure 1:
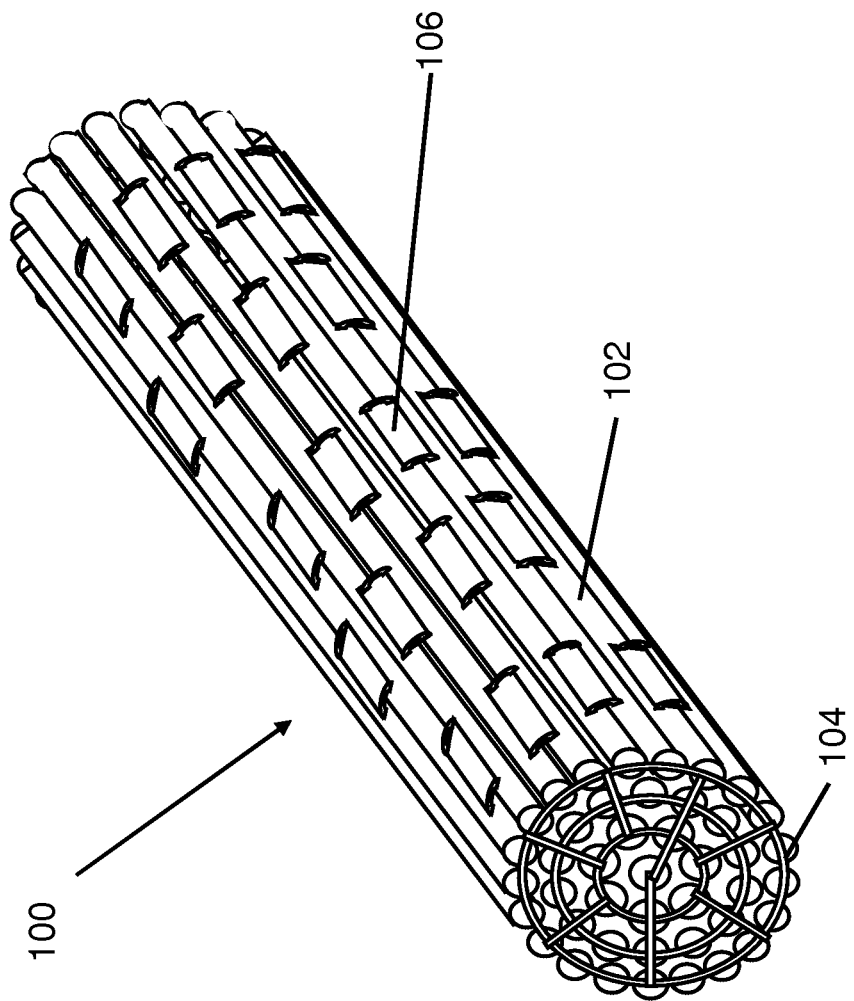
FIG. 1 is a perspective view of a bundle of PHWR fuel elements each comprising a sapphire tube housing a plurality of fuel pellets.

Referring to FIG. 1, a fuel assembly 100 comprises a bundle of fuel elements 102 connected together with/by a pair of end plates 104.

Referring also to FIGS. 2 and 2A, each of the fuel elements 102 shown in FIG. 1 comprises a plurality of fuel pellets 108 concatenated in cladding 110 in the form of a tube closed at each end by an end cap 112. The cladding 110 and end caps 112 are made of an inert material that is substantially transparent to infrared radiation, specifically sapphire. FIG. 1 also shows a plurality of part-cylindrical tabs 106 distributed around the outwardly-facing surfaces of the outermost ones of the fuel elements 102. Each of these tabs 106 has a larger contact area than a typical bearing pad so that, in comparison, the contact pressure would be reduced. The tabs 106 also are made of sapphire, for example single crystal sapphire. Hence, the tabs 106 can be envisioned as "windows" that are transparent to thermal radiation. It will be appreciated that it would be convenient to use the same material for the tabs 106, cladding 110 and end caps 112, especially single crystal sapphire.

Single crystal sapphire may be preferred because of one or several of a range of properties. Examples include good thermal radiation transmission characteristics, inertness to corrosion in irradiated high temperature (and even supercritical) water, high melting temperature (greater than 2000° C.), low neutron absorption comparable to existing cladding materials), desirable mechanical characteristics under neutron radiation under a wide range of temperatures, and thermal and mechanical strain characteristics compatible with those of uranium dioxide (fuel). Moreover, single crystal sapphire does not deteriorate under prolonged irradiation, unlike polycrystalline sapphire which deteriorates mechanically due to the anisotropic irradiation growth of the crystals.

As can be seen from FIG. 2A, which shows, magnified, a cross-section through one of the fuel elements 102 of FIG.

2, when the fuel element 102 first is manufactured, there is a small difference in diameter between the inner surface of the cladding 110 and the exterior of the fuel pellet 108, leaving an annular cylindrical space 114 around the concatenated pellets 108. This space is filled with pressurized helium.

Figure 3A:
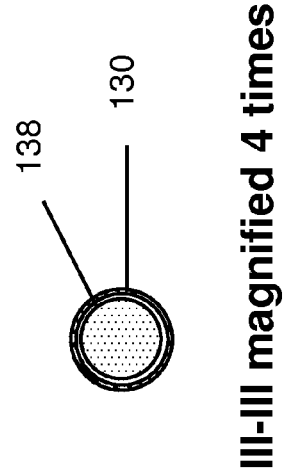
FIG. 3A is a cross-sectional view taken on the line A-A of FIG. 3.
Figure 3:
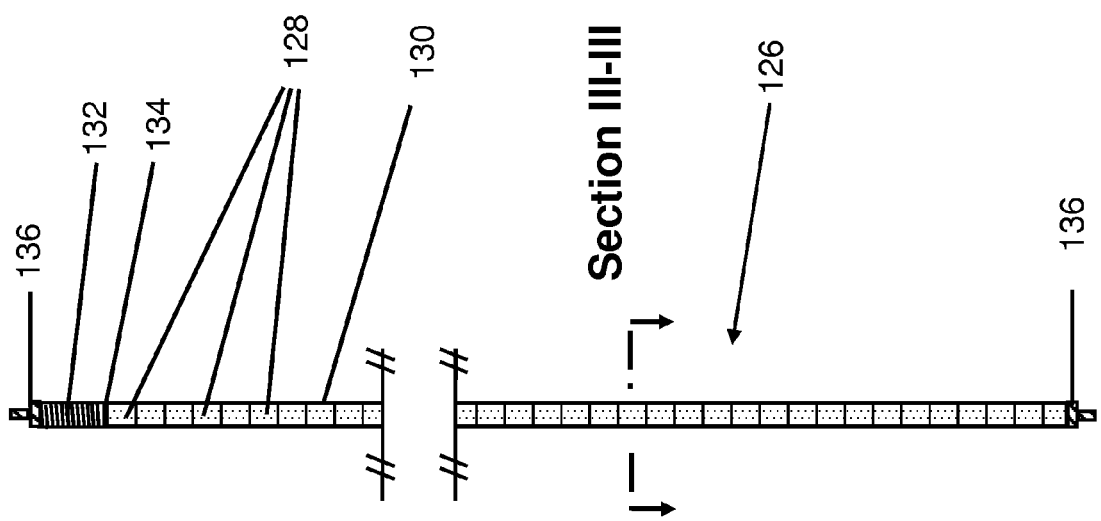
FIG. 3 is a cross-sectional view of a BWR fuel element.

While FIGS. 2 and 2A were for a PHWR, FIGS. 3 and 3A show a fuel element 126 for a BWR fuel assembly, comprising a plurality of fuel pellets 128 concatenated in cladding 130 in the form of a tube. The fuel pellets 128 are held tightly together end to end by a spring 132 applying force to a spacer 134 in contact with the endmost fuel pellet. The cladding tube 130 is closed at each end by an end cap 136.

As was the case with the PHWR fuel element of FIGS. 2 and 2A, the cladding 130 and end caps 136 of the BWR fuel elements in FIG. 3 are made of single crystal sapphire.

As before, the desirable properties of single crystal sapphire make it preferred for the fuel element of the BWR.

As can be seen from FIG. 3A, there is a small difference in diameter between the inner of the cladding 130 and the outer of the fuel pellet 128, leaving an annular cylindrical space 138 around the concatenated pellets 128; similarly to FIG. 2A. This space is filled with pressurized helium.

It should be appreciated that a PWR fuel element can be manufactured using similar materials to the BWR fuel element 126 shown in FIGS. 3 and 3A, the principal differences being the use of different fuel pellets and slightly different dimensions of the fuel element components.

The sapphire components of the above-described fuel elements and fuel assembly in FIGS. 1, 2, 2A, 3 and 3A are made of single crystal sapphire using edge defined film fed growth methods to produce roughed out and blank components. The rough sapphire components may have ridges, variability and roughness that make them unsuitable for their nuclear component application. This is especially the case for the cladding tubes.

To eliminate the ridges, roughness and variability, the tubes will be high temperature fine formed to produce a tube having uniform internal diameter and uniform wall thickness. This forming will make use of the high temperature creep properties of sapphire that result in it slowly deforming at temperatures around 1700° C. to 2000° C. under sustained high pressure or load. Either or both of two thermal forming processes may be used, namely "thermal creep drawing" and/or "thermal differential expansion moulding".

Thermal creep drawing and thermal creep differential expansion moulding methods embodying the present invention differ from conventional tube forming processes in that forming occurs at very high temperatures and relies on the thermal creep properties of an otherwise non-ductile material, sapphire, to achieve the desired part shape.

Thermal Creep Drawing

Thermal creep drawing may be used for fine forming the cladding tubes 110. Thus:

Step 1 is to heat the rough sapphire tube up to the creep temperature of 1700° C. to 2000° C.

In step 2, the rough sapphire tube is then slowly drawn and/or pushed through a plug and die set to reduce the ridging and irregularities on the inner and outer surfaces of the roughed tube.

In optional step 3 the tube is allowed to thermally soak at a temperature slightly above the drawing temperature to relieve any work hardening that may have occurred during the drawing process.

In step 4, the tube from step 2 or optional step 3 is drawn or pushed through another plug and die set having slightly tighter internal external diameters to reduce the tube thickness and further reduce ridging and non-uniformities.

Steps 2, 3 (as appropriate) and 4 are repeated at successively tighter plug and die sizes until the desired cladding tube finish and hot dimensions are achieved.

Step 5 is a final hot soak to remove any internal stresses from the forming operation.

Step 6 is a slow cooling of the tube to room temperature where its final dimensions and surface uniformity are confirmed by measurement.

The moulding of inner and outer surface may be interspersed, but the last step would be moulding of the inner surface.

Thermal Creep Differential Moulding

Thermal creep differential expansion moulding requires a mould that is made of a material that has a different coefficient of expansion than sapphire and is non-wettable by sapphire. The mould is sized and shaped to give the desired diameters and surface uniformity of the cladding tube when heated to the sapphire creep temperature range of 1700° C. to 2000° C. The internal diameter dimension and surface uniformity are the most critical to fuel element performance, so the exterior of the rough cladding tube is moulded before the internal diameter which therefore is the last step.

Step 1 is to place the rough sapphire tube in the external diameter mould having a lower thermal coefficient of expansion than sapphire, and slowly heat the tube mould assembly to the creep temperature range.

Step 2 is to hold the assembly at the upper end of the creep temperature range for a creep and soak period to allow creep to progress and relieve the stresses from the compression of the sapphire tube by the mould.

Step 3 is to slowly cool the assembly, allowing the sapphire tube to shrink from the mould such that it can be withdrawn at room temperature.

Steps 1, 2 and 3 can be repeated successively with tighter dimension moulds until the cladding tube achieves the desired outer diameter and surface uniformity.

Step 4 is to place the rough sapphire tube in the internal diameter mould, having a higher thermal coefficient of heating than sapphire, and slowly heat the tube mould assembly to the creep temperature range.

Step 5 is to hold the assembly at the upper end of the creep temperature range for a creep and soak period to allow creep to progress and relieve the stresses from the compression of the sapphire tube by the mould.

Step 6 is to slowly cool the assembly, allowing the mould to shrink from the sapphire tube such that is can be withdrawn at room temperature.

Steps 4, 5 and 6 can be repeated with tighter dimension moulds until the cladding tube achieves the desired inner diameter and surface uniformity As in the case of thermal creep drawing described above, forming of the inner and outer surfaces may be interspersed, but the final step will be forming of the inner surface.

The mould may be adapted to apply pressure to form the inner surface or the outer surface of the sapphire, or both surfaces at the same time.

The cladding tubes 110 are subject to the thermal fine forming processes to obtain tight tolerances on the internal diameter and wall thickness. The cladding end caps 112 may be cut from bar stock of ground rods. The endplates 104 may be cut from ground and polished blanks of sheet material. The tabs 106 may be thermally fine formed and/or ground to obtain a smooth bearing surface which, once the fuel assembly is installed in a fuel channel, abuts the inner surface of the fuel channel.

The method of assembly is the same for both of the fuel elements shown in FIGS. 2 and 3, so the assembly will be described using the reference numbers of that shown in FIG. 2.

The fuel elements 102 are assembled by inserting a row of fuel pellets 108 into a cladding tube 110 that is heated to a temperature that allows easy insertion. The pellets 108 are positioned such that there is a controlled distance between the last pellets in the row and the ends of the cladding tube 110. The cladding tube 110 is allowed to cool such that its temperature equalizes with the temperature of the fuel.

The end caps may each comprise a plug (not shown) that inserts into the end of the cladding tube and a rim which has the same diameter as the outer diameter of the cladding tube and abuts the respective end of the cladding tube. (Optionally the end cap may comprise a plug without a rim, or even a flat plate, though the latter is least preferred.) The surfaces of the plugs and rims which will contact the cladding interior and ends, respectively, are coated with a thin layer of aluminium nitride. The end cap is cooled and/or the cladding tube (containing the fuel pellets) is heated to facilitate the insertion of the plugs of the end caps 112 into the cladding tubes 110 while maintaining a controlled gap between the last fuel pellet and the inwardly-facing surface of the end cap 112. The assembly then is allowed to cool or heat, as the case may be, to ambient.

A localized infrared heat source, such as a laser, is used to illuminate and heat the aluminium nitride preferentially until its temperature exceeds the melting temperature of sapphire, which then melts the abutting sapphire surfaces. The molten aluminium nitride and sapphire mix forms an aluminium oxy-nitride bond. The source of infrared heating is removed and the bond is allowed to cool and solidify forming a solid joint between the cladding tube and end cap. The resulting assembly is a single fuel element 102.

The spacing between the fuel elements in a fuel bundle assembly can be maintained by spacer pads attached to the fuel element cladding tube 110. The spacer pads would be made from edge defined film fed growth sapphire rod that is cut to the required thickness of the spacer. The face of the spacer that is to be attached to the cladding tube would be coated with aluminium nitride. The spacer would be joined to the cladding tube using the same infrared heating method as used to join the end caps to the cladding tube.

A fuel bundle 100 is made by assembling the desired number and size of fuel elements 102 in a fixture that sets the fuel bundle geometry.

End plates 104 which hold the bundle of fuel elements 102 are coated with aluminium nitride on one face and the end plate is placed in the assembly fixture such that the aluminium nitride coated face abuts each of the fuel element end caps. A localized infrared heat source such as a laser is used to illuminate and heat each of the aluminium nitride coated end plates at its interface with respective fuel element end caps. The heating progresses until the aluminium nitride coated surfaces of the end plate and contacting fuel element end cap surface begin to melt. The molten aluminium nitride and sapphire mix forms an aluminium oxy-nitride bond. The source of infrared heating is removed and the bond is allowed to cool and solidify forming a solid joint between the end plate and fuel element end caps.

The last step in fuel bundle 100 assembly is to join the tabs 106 to the outer ring of elements 102. The tabs are made from edge defined film fed growth sapphire grown in a cylindrical shell segment form. The tabs are placed at intervals as illustrated in FIG. 1. The tabs are joined with the outer ring of fuel elements using the infrared heating process described for joining the end caps to the cladding tubes. The aluminium nitride required for the infrared absorption and bond is applied to the joint location on the outer elements. Once all of the tabs have been attached, their respective outer surfaces are ground and polished to produce a smooth and accurate outer diameter profile for the bundle.

It is to be kept in mind that the foregoing descriptions of specific embodiments and modifications thereto, and attached Figures, are presented by way of example only and should not be construed as limiting the inventive concept to any particular physical configuration or process. It is to be clearly understood that the scope of the present invention is limited only by the appended claims.

The invention claimed is:

1. A method of surface finishing a cladding tube for a fuel element of a nuclear reactor core in which the cladding tube contains a plurality of fuel, comprising the steps of:
   heating the tube to thermal creep temperatures for the sapphire; and
   slowly drawing and/or pushing the heated tube through a plug and die set to reduce heights of ridges on respective inner and outer surfaces of the tube while limiting changes in the crystalline structure, especially the crystal orientation, of the bulk of the tube.

2. A method according to claim 1, wherein the plug and die set are dimensioned to provide substantially uniform wall thickness of the tube while reducing ridge height and limiting changes in the crystalline structure, especially the crystal orientation, of the bulk of the tube.

3. A method according to claim 1, wherein the forming displaces irregularities by producing shear along an "a" plane parallel to a principal "c" axis of the tube material.

4. A method according to claim 1, wherein the tube is drawn or pushed in a similar manner through a plurality of plug and die sets, each succeeding plug and die set having a slightly larger inner diameter and slightly smaller outer diameter, respectively, than its predecessor so as to reduce ridge height in successive steps, a final plug and die set having respective inner and outer diameters corresponding to finished outer and inner diameters of the tube.

5. A method according to claim 4, wherein the tube is allowed to thermally soak between die passes at a temperature slightly above the drawing temperature to alleviate any work hardening and make the ridges workable during subsequent drawing.

6. A method of surface finishing a sapphire tube by thermal creep differential expansion moulding using a mould that is made of a material that has a different coefficient of expansion than sapphire and is non-wettable by sapphire, the mould being sized and shaped to give desired diameters and surface uniformity of at least one of inner and outer surfaces of the tube, the method comprising:
   placing the rough sapphire tube in the mould and slowly heating the tube-mould assembly to the range of the creep temperature of the sapphire and causing pressure at an interface between the sapphire and the mould;
   maintaining the assembly at the upper end of the creep temperature range for a creep and soak period to allow creep to progress and relieve the stresses from the pressure upon the sapphire tube from the mould; and
   slowly cooling the assembly, allowing the sapphire tube to part from the mould so that it can be withdrawn.

7. A method according to claim 6, wherein the mould is configured and dimensioned to apply pressure to form the inner surface of the sapphire tube.

8. A method according to claim 6, wherein the mould is configured and dimensioned to apply pressure to form the outer surface of the sapphire tube.

9. A method according to claim 6, wherein the mould is configured and dimensioned to apply pressure to form both inner and outer surfaces of the sapphire tube at the same time.

10. The method according to claim 1 wherein the step of heating comprises heating to the tube to a temperature in the range of 1700-2000 degrees Celsius.

11. The method according to claim 6 wherein the step of heating comprises heating the tube-mold assembly to a temperature in the range of 1700-2000 degrees Celsius.

\* \* \* \* \*